July 2, 1940.  A. S. VILLASUSO  2,206,341
PROCESS FOR THE OBTENTION OF JUICE FROM SUGAR CANE
Filed Jan. 5, 1939
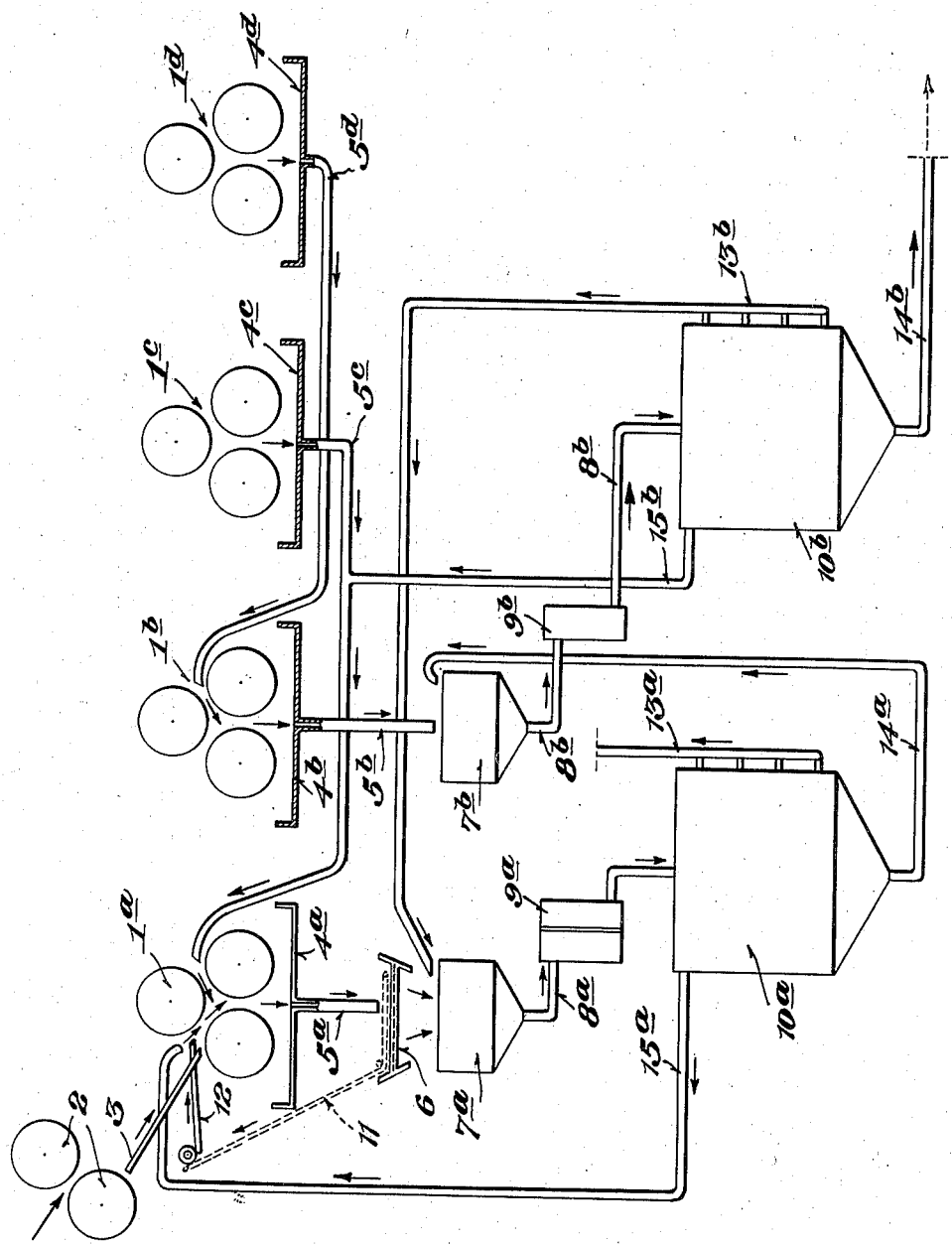
Inventor
Armando S. Villasuso,
By Walhauflev & Groff
Attorneys

UNITED STATES PATENT OFFICE 2,206,341

PROCESS FOR THE OBTENTION OF JUICE FROM SUGAR CANE

Armando S. Villasuso, Ingenio Concepcion, Tucuman, Argentina

Application January 5, 1939, Serial No. 249,536
In Argentina October 31, 1938

3 Claims. (Cl. 127—43)

This invention relates to improvements in processes for the obtention of juice from sugar cane, and has for its main object an improved extracting process which enables the obtention of maximum yield of raw material.

In the extraction of sugar juice from sugar cane, it is known to submit said canes, after the leaves have been removed, to the action of the mill for the crushing thereof; as a result of this operation, and the compression exerted thereby, the sugar juice is separated from the raw material, leaving as a residue a solid material known in the industry as bagasse, of secondary application.

The sugar juice obtained is then submitted to the chemical action of lime, in a milk condition, mainly for the purpose of neutralizing the free acidity thereof, after which it is submitted to the action of heat which causes the coagulation of certain components and facilitates the subsequent evaporation of the volatile products, thereby rendering said juice ready to be submitted to defecation or clarification.

This latter operation is carried out in suitable defecating or clarifying tanks where the juice is allowed to stand for a certain period of time, and through decantation said juice is arranged in the form of layers constituted by foam and clear juice, while the heavier substances precipitate to the bottom of said tanks, in a sludge form known as scums; however, a considerable part of the light substances such as fiber particles (small bagasse), gums, waxes, etc., which remain suspended in the juice, remain on the surface of the defecators, that is to say, level with the first layer and are carried out by the corresponding foam.

When separating the rich and poor juices, for the purpose of submitting the poor juice to a double defecation, the scum and the foam of the rich juice are incorporated to the poor juice in order to obtain a poorer residual scum.

It is know that the action of lime and heat on the substances contained in the foam cause the formation of certain agents producing a loss of saccharose.

On the other hand, the foam forming the upper layer only overflows the defecators when the free level of the juice rises, and as a result of this a considerable portion of the rich juice is incorporated in the poor juice produced by the first defecation, and to the residual scum of the second defecation, which is precisely what it is desired to render poorer.

In order to obviate these drawbacks the present invention has been devised, which consists mainly in keeping the foam and the corresponding scum perfectly separated from each other at all times, incorporating said foam to the bagasse of the mill most suitable to the pureness and richness of said bagasse, and submitting the foamless scum to any of the subsequent treatments commonly employed.

The invention also contemplates other objects which will become apparent from the course of the following specification.

In order that the invention may be more clearly understood and readily carried into practice, same has been illustrated by way of example and in a preferred embodiment in the accompanying drawing, which shows a schematic view of a plant for the extraction of cane juice, improved in accordance with the present invention.

In said drawing, the reference characters 1a, 1b, 1c and 1d indicate a series of mills for the purpose of crushing the sugar cane, which is carried to the first of said mills by means of the feeding device formed by the pair of cylinders 2 and the inclined plane 3. Underneath each of said mills are the trays 4a, 4b, 4c and 4d, from which lead the tubes 5a, 5b, 5c and 5d, respectively, for the discharge of the corresponding juices.

The juice discharged by the conduit 5a, corresponding to the first mill, after passing through a filter 6, is poured into the lime vat 7a containing a suitable amount of lime milk, from where it leaves by the lower conduit 8a having interpolated therein a heater 9a, finally passing to the reservoir 10a wherein the clarifying of said juice is effected by decantation. In turn, below the discharge conduit 5a is a small conveyor 11, suitably combined with a plane 12, which again carries the residual small bagasse or fibrous particles of the cane, to the first mill 1a where they are submitted to a new crushing treatment.

The figure also shows that the juice discharged by the conduit 5b, corresponding to the second mill, passes directly to a second lime vat 7b from where it is discharged through conduit 8b having a heater 9b interpolated therein, to fall into the second decantation reservoir 10b which is similar and serves for the same purpose as the previous one. The clear juices contained in each of said decantation or defecating tanks leave by the side conduits 13a and 13b starting from different levels thereof. In turn, the scum or heavier substances are extracted through the conduits 14a and 14b starting from the lower portion of said reservoirs, and finally the foams, which due to their low density are located on top, are extracted through the upper tubes 15a and 15b.

According to the present invention, the conduit 15a starting from the upper portion of the decantation tank 10a and through which, as already stated, a large amount of light substances such as fiber particles (small bagasse) gums, waxes, etc., in suspension, may be discharged together with the foam, extends upwardly leading again into any one of the mills forming the set, for example the first mill 1a, where the light substances are submitted to a new combined crushing and compression process, and after being incorporated to the bagasse formed therein, suffer the previously described successive operations.

In turn, the first sediment or scum, which is eliminated through the lower conduit 14a is carried to the lime vat 7b where it suffers a further calcification followed by new heating in the heater 9b to pass into the second defecating tank 10b where it suffers a new decantation, the sediment of which, forming the second scum, is collected by the lower conduit 14b for submitting same to the action of a centrifugal separator, press filter, third decantation or any of the commonly used subsequent treatments.

The bagasse remaining as a residue from the first mill 1a is passed to the second mill 1b and the juices separated therefrom are discharged through the lower conduit 5b, passing together with the first scum or sediment of the decantation tank 10a to the lime vat 7b, heater 9b and finally to the second decantation tank 10b. In turn, the bagasse which has remained as a residue from the second mill is passed to the third mill 1c, and the juice resulting from this operation is discharged through the lower conduit 5c, passing again to the first mill 1a where it is incorporated to the products treated thereby; finally, the bagasse remaining as a residue of the third mill after having been suitably macerated with water is passed to mill 1d and the resulting juice is discharged through the lower conduit 5d carrying same to the second mill 1b, following therefrom the previously described circuit, while the bagasse remaining as final residue from said mill 1d is separated and disposed of as fuel or for any other purpose.

The foam formed on the surface of the second decantation tank 10b and which may still contain some light products in suspension, is discharged through conduit 15b, which is suitably connected to conduit 5c, passing again to the first mill 1a for subsequent treatment; finally, the poor juice extracted from the decantation tank 10b through the conduit 13b passes again to the lime vat 7a where it again suffers the operations described above.

By means of this process, the foams are at all times kept perfectly separated from the corresponding scums, thereby obviating the abovementioned drawbacks.

While in the example represented a plant constituted by four sets of mills has been assumed, it is evident that the number thereof, as well as the number of lime vats and defecating tanks, may vary in accordance with the requirements of each case.

In turn, the foam coming from the decantation tank 10a, instead of returning to the first mill, may be carried to any of the mills more suitable for the richness of the bagasse being formed therein, while the residual scum of the first defecating tank will be incorporated to the juice coming from the subsequent mills to the mill receiving the foam coming from said defecating tank.

The operation, as explained above, is clear and requires no further details for those skilled in the art.

It is evident that several modifications in construction and detail may be introduced without departing from the scope of the present invention as clearly set forth in the appended claims.

What I claim is:

1. The process of extracting the juice from sugar cane which consists in subjecting sugar cane to a plurality of stages of crushing operations, collecting the juices from the operations in independent volumes, allowing each volume of juice to settle whereby lighter elements of the volume rise as foam and heavier elements settle as scum, conducting the foam from the first volume directly back to the first stage of crushing operation, conducting the scum from the first volume of juice into the second volume of juice, conducting the foam from the second volume of juice back to the first stage of crushing operation, and conducting the juice of the second volume into the first volume of juice.

2. The process of extracting the juice from sugar cane which consists in subjecting sugar cane to a plurality of stages of crushing operations collecting the juices from the operations in independent volumes, allowing each volume of juice to settle whereby lighter elements of the volume rise as foam and heavier elements settle as scum, conducting the foam from the first volume directly back to the first stage of crushing operation, conducting the scum from the first volume of juice into the second volume of juice, conducting the foam from the second volume of juice back to the first stage of crushing operation, conducting the juice of the second volume into the first volume of juice, subjecting the mass of crushed cane from the second stage of crushing operation to a third crushing operation, and conducting the juice from the third stage directly back to the cane passing through the first stage.

3. The process of extracting the juice from sugar cane which consists in subjecting sugar cane to a plurality of stages of crushing operations, collecting the juices from the operations in independent volumes, allowing each volume of juice to settle whereby lighter elements of the volume rise as foam and heavier elements settle as scum, conducting the foam from the first volume directly back to the first stage of crushing operation, conducting the scum from the first volume of juice into the second volume of juice, conducting the foam from the second volume of juice back to the first stage of crushing operation, conducting the juice of the second volume into the first volume of juice, subjecting the mass of crushed cane from the second stage of crushing operation to further stages of crushing operations, and conducting the juice from each of said further stages direct to the material passing through each second preceding stage.

ARMANDO S. VILLASUSO.